United States Patent [19]
Paros et al.

[11] Patent Number: 4,751,849
[45] Date of Patent: Jun. 21, 1988

[54] FORCE-SENSITIVE RESONATOR LOAD CELL

[75] Inventors: Jerome M. Paros, Kirkland; Donald W. Busse, Redmond; Martin D. Chinn, Bellevue; Walter P. Kistler, Redmond; Richard B. Wearn, Jr., Seattle, all of Wash.

[73] Assignee: Paroscientific, Inc., Redmond, Wash.

[21] Appl. No.: 875,327

[22] Filed: Jun. 17, 1986

[51] Int. Cl.⁴ .............................................. G01L 1/10
[52] U.S. Cl. ..................................... 73/862.59; 73/778
[58] Field of Search ........ 73/862.59, 862.63, 517 AV, 73/702, 704, 855, 778, DIG. 1, DIG. 4; 310/346, 338

[56] References Cited

U.S. PATENT DOCUMENTS 3,082,621  3/1963  Soderholm ........................ 73/855 X
4,091,679  5/1978  Furusawa et al.
4,479,385  10/1984 Koehler.
4,498,344  2/1985  Dinger.
4,594,898  6/1986  Kirman et al.

FOREIGN PATENT DOCUMENTS 0794546  1/1981  U.S.S.R. ....................... 73/517 AV

OTHER PUBLICATIONS

"An Optically Powered Vibrating Quartz Force Sensor", By: S. M. McGlade and G. R. Jones, *GEC Journal of Research*, vol. 2, No. 2, 1984.
"Quartz Crystal Accelermotor Insensitive to Temperature Variation", by Morio Onoe et al., 1977.
"Precision Force Transducers Using Mechanical Resonators," By: T. Ueda, F. Kohsaka and E. Ogita, *Measurement*, vol. 3, No. 2, Apr.-Jun. 1985.
TEW Article—Tokyo Denpa Co., Ltd., "Quartz Pressure Transducer".

*Primary Examiner*—Charles A. Ruehl
*Attorney, Agent, or Firm*—Seed and Berry

[57] ABSTRACT

A load cell having single or multiple resonators arranged to receive a strain that is proportional to the strain in a beam to which the resonator(s) is attached. Arrangement of the multiple resonators with respect to a force-bearing beam of the cell determines whether the cell is a bending mode load cell or a shear mode load cell. Absolute and differential pressure sensors, accelerometers and weighing devices are disclosed which employ the multiple-resonators of the invention.

6 Claims, 18 Drawing Sheets

FORCE-SENSITIVE RESONATOR LOAD CELL

TECHNICAL FIELD

The present invention relates generally to load cells characterized as having a frequency output as a function of the applied load, and more particularly, to a load cell employing such force-sensitive resonators.

BACKGROUND ART

The widespread use of digital computers and digital data acquisition systems has generated the need for measurement devices having digital-type outputs. A number of digital force sensors exist in the prior art. Resonant force sensors whose frequencies of vibration vary with applied stress are described in U.S. Pat. No. 3,470,400 by Weisbord, U.S. Pat. No. 3,479,536 by Norris, U.S. Pat. No. 4,215,570 by EerNisse, U.S. Pat. No. 4,372,173 by EerNisse and Paros, and U.S. Pat. No. 4,498,344 by Dinger. In order to operate as accurate measurement devices, these resonant sensors must be carefully incorporated into the force-producing structures, as shown in U.S. Pat. No. 4,384,495 by Paros. Also, these sensors operate best in a vacuum or inert atmosphere and thus should be environmentally isolated from the force-producing structures through means as described in U.S. Pat. No. 4,406,966 by Paros. The latter patent also describes means by which the temperature characteristics of a force-sensitive resonator may be improved by combining the inherent temperature sensitivity of the resonator with thermally induced mechanical loads. Temperature-induced errors can be large unless the reactive structural spring rates are low or, as with Dinger (U.S. Pat. No. 4,498,344), the coefficients of thermal expansion are closely matched between the resonator and the structure. Indeed, in U.S. Pat. No. 4,448,546, Paros describes a digital temperature sensor based on thermal mismatch between a resonator and base structure. The foregoing prior art devices suffer from complex and costly arrangements in which environmental errors such as temperature cause large errors. U.S. Pat. No. 4,091,679, by Furusawa et al., discloses an accelerometer having two vibrating quartz resonators coupled to each other which are directly loaded by an inertial mass. The beat frequency between the two resonators is a measure of the applied acceleration.

DISCLOSURE OF INVENTION

It is an object of the invention to provide a highly accurate load cell that generates a digital output.

It is another object of the invention to provide a load cell that is unaffected by temperature variations and the manner in which forces are applied to the load cell.

It is another object of the invention to provide a high-performance load cell that is relatively inexpensive to manufacture.

It is still another object of the invention to provide a digital load cell that can operate in either a shear or a bending mode.

It is a further object of the invention to provide a load cell utilizing a digital force sensor as a strain sensor.

These and other objects of the invention are provided by a resonator load cell having a beam supported at one or more locations. The beam receives a force at a location spaced apart from the support points for the beam, thereby causing the beam to bend in proportion to the magnitude of the force. One or more force-sensitive resonators are mounted on the beam at locations that cause the resonators to be stressed in response to strains imparted to the beam by the applied force. With more than one resonator, they can be mounted on the beam at locations that cause the resonators to be stressed in opposite directions by applied forces and in the same direction in response to axial strains or thermal expansion of the beam. Thus the differences in stress on the resonators can be used to measure applied forces, while the sum of the stress can be used to distinguish extraneous effects, such as axial strains or thermal strains. The load cell may operate in a bending mode in which a resonator is mounted on a portion of the beam that is tensioned or compressed in response to the applied force. If desired, another resonator can be mounted on a second portion of the beam spaced apart from the first portion by the neutral bending axis of the beam so that the second portion is stressed oppositely in response to the applied force. Alternatively, the load cell may operate in a shear mode in which the resonator or resonators are mounted on surfaces of the beam such that shear in the beam causes the resonator or resonators to be stressed in tension and/or compression. In one possible configuration, the resonators are positioned so that they overlap each other, with the areas of attachment to the beam defining the corners of a parallelogram. In various embodiments, beams are supported at either one or both ends, and they are either pivotally or fixedly supported. The beams may carry either a single resonator or multiple resonators. With multiple resonators, the resonators can be mounted as pairs to compensate for thermal stress or other extraneous loads. The load cell can also be adapted as a pressure sensor or accelerometer in various configurations.

Whether using one or more resonators for the load cell, the resonators can be attached to the beam at spaced-apart mounting pads rather than along their full length, as with most stress gauges. Also, only the most basic form of resonator with end mounting pads need be used rather than the more complex form of resonator with attendant frames and plates, as required by Dinger. This ability to span widely separated or closely adjacent mounting pads allows new and novel arrangements of shear cells, resulting in insensitivity to thermal stress or orthogonal forces and loads.

This invention meets the design objectives of a measurement device having a digital-type output, high accuracy, low power consumption, small size and weight, and low sensitivity to environmental errors. These goals are met through the use of a dual-resonator load cell having high common mode rejection of environmental errors.

BEST MODE FOR CARRYING OUT THE INVENTION

Figure 1:
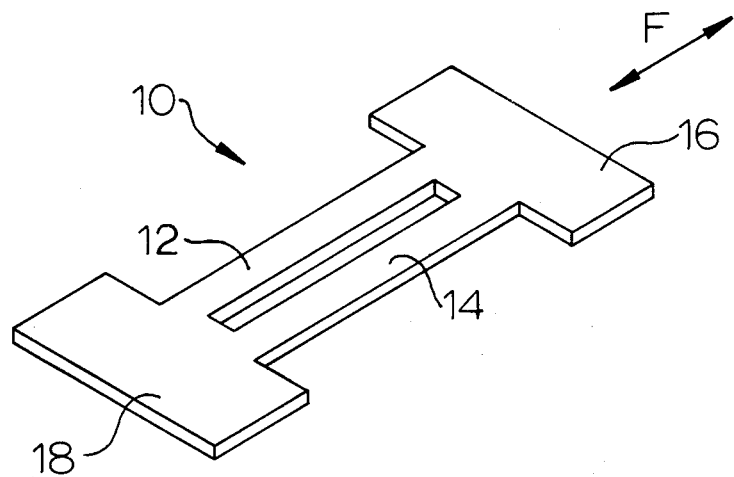
FIG. 1 is an isometric view of a conventional double-ended tuning fork resonator force sensor.

FIG. 1 is an isometric view of a conventional double-ended tuning fork resonator force sensor 10, such as is described by EerNisse and Paros in U.S. Pat. No. 4,372,173. Two tines 12 and 14 vibrate 180 degrees out of phase such that their reaction forces and moments cancel, resulting in low energy transfer to the mounting pads 16 and 18. When forces F are applied to resonator 10, its frequency of vibration changes, thus providing a measure of the applied force.

Figure 2:
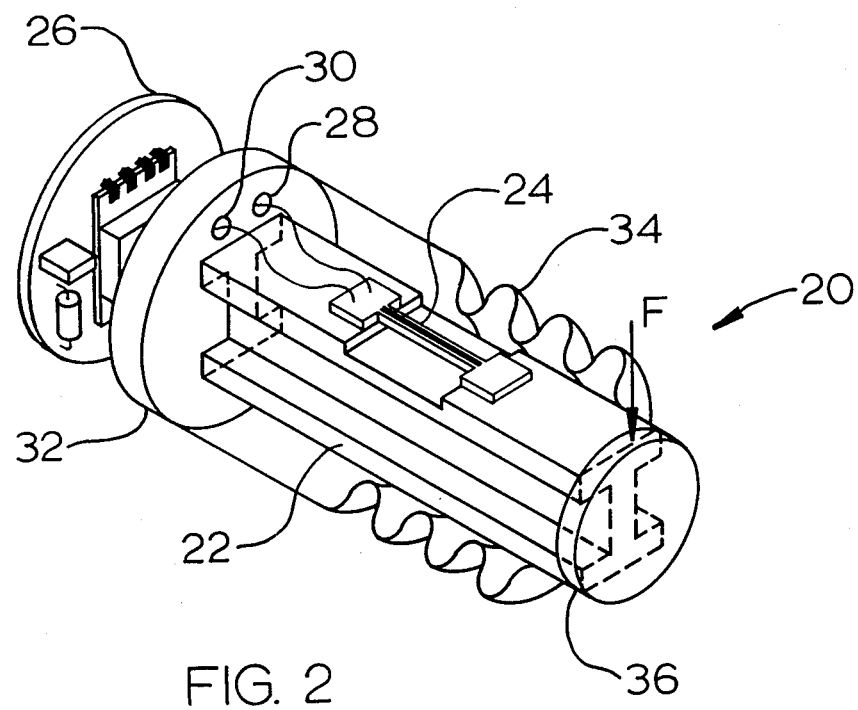
FIG. 2 is an isometric view of a single-resonator bending stress load cell.

FIG. 2 is an isometric view of a bending stress load cell 20 consisting of cantilever beam 22 to which a force-sensitive resonator 24 is attached. When force F is applied to the end of the beam, force-sensitive resonator 24 is stressed and the change in frequency is a measure of applied force F. The stress in resonator 24 can be either compression or tensile, depending on the direction of force F. The resonator 24 is electrically connected to oscillator 26, which maintains the vibrations in resonator 24. The electrical connections are made through hermetic feed-throughs 28 and 30 located in the base 32. A bellows 34 is hermetically sealed to base 32 and end 36 of cantilever beam 22 so that resonator 24 may operate in a vacuum or inert atmosphere.

The configuration of FIG. 2 shows the basic elements of a single force-sensitive resonator load cell. The force-sensitive resonator is used in its most elementary form and does not require or use frames, bases, or plates, as required by Dinger, for mounting or providing a vacuum in which to operate. Such framework and plates as required by Dinger would absorb some of the applied stress, reducing the sensitivity of the resonator, and would result in additional mounting interfaces that would produce strain hysteresis and strain creep as the mechanical joints deformed under stress and cycling. The load cell of FIG. 2 is sensitive to thermal stress caused by the difference in the thermal expansion coefficients between the force-sensitive resonator 24 and cantilever beam 22. This thermal sensitivity in a single-resonator load cell can be compensated by (a) matching coefficients of thermal expansion between the resonator and the beam, (b) maintaining the load cell at constant temperature, or (c) measuring the temperature of the load cell and correcting for the known thermal stress which would be added to the applied load stress.

Figure 3:
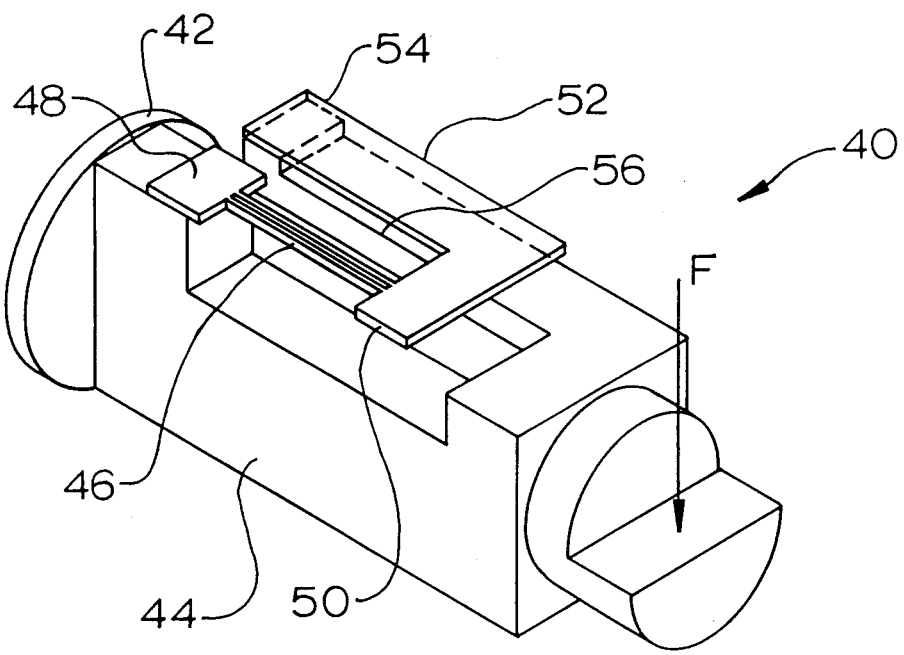
FIG. 3 is an isometric view of a single-resonator bending stress load cell with temperature compensation.

FIG. 3 is an isometric view of a bending stress load cell 40 with compensation means for thermal stress. Load cell 40 consists of base 42 and cantilever beam 44, to which is attached force-sensitive resonator 46 at location 48. End 50 of resonator 46 is connected to arm 52, which, in turn, is attached at end 54 to projection 56 of cantilever beam 44. When force F is applied to beam 44, end 54 of projection 56 moves relative to location 48 of cantilever beam 44, placing the force-sensitive resonator 46 in tension and arm 52 in compression, causing the frequency of resonator 46 to increase. This frequency change is a measure of the load F applied. If the force F is in the upward direction, the stress and frequency change is of opposite polarity.

Resonator 46 and arm 52 are made of materials with the same thermal expansion coefficients. Thus, no thermal stress is imposed on resonator 46 since it expands with temperature at the same rate as arm 52. Arm 52 can be made stiff relative to resonator 46 so that most of the strain due to translation of end 54 relative to location 48 is transmitted to resonator 46, maintaining high sensitivity to deflection of cantilever beam 44. Resonator 46 and arm 52 can be made of one piece of material, such as piezoelectric quartz. Also, the resonator and arm can be made symmetrical by adding another arm and projection similar to arm 52 and projection 56 to the opposite side of resonator 46.

Figure 4:
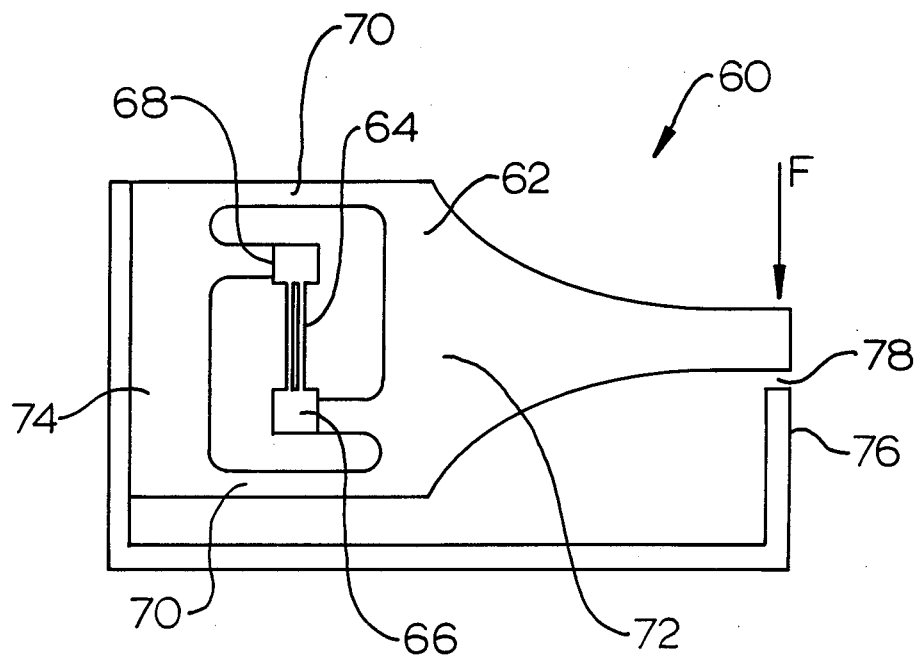
FIG. 4 is an plan view of a single-resonator shear stress load cell.

FIG. 4 is a plan view of a shear mode load cell 60 consisting of cantilever beam 62 with resonator 64 attached at locations 66 and 68. When load F is applied, the arms 70 deflect in parallelogram fashion, allowing end 72 of beam 62 to deflect downwardly with respect to end 74. This deflection places resonator 64 in tension, causing an increase in frequency. This increase in frequency is a measure of the applied load F.

The cantilever beam and the crystal are protected from overload by stop 76, which allows free deflection of cantilever arm 62 within gap 78 but provides support for load F above a predetermined limit.

Figure 5:
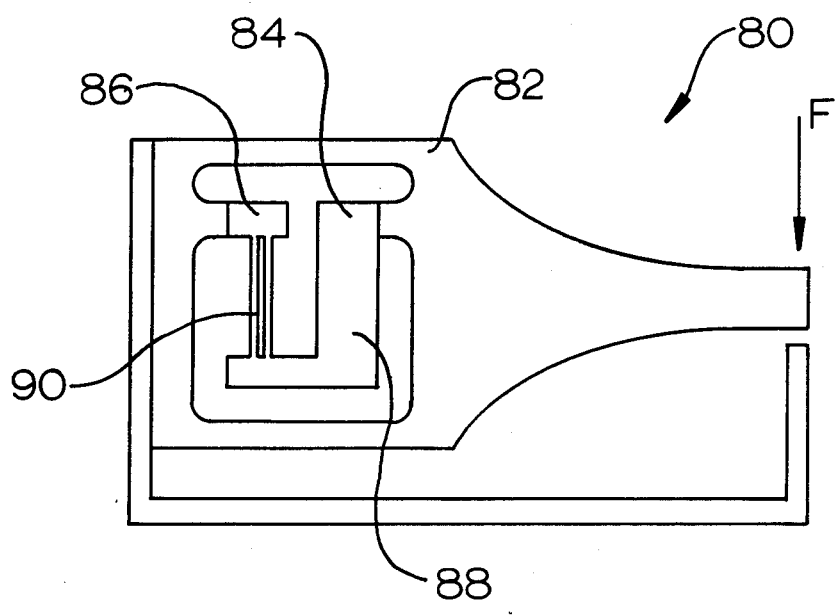
FIG. 5 is an plan view of a single-resonator shear stress load cell with temperature compensation.

FIG. 5 is a plan view of a shear load cell 80 with thermal compensation similar to that used in the load cell of FIG. 3. Cantilever beam 82 deflects under load F, causing mounting pad 84 to deflect downwardly with respect to adjacent mounting pad 86, placing resonator 90 under tension and increasing its frequency. This increase in the frequency of resonator 90 is a measure of the applied load F. Resonator 90 and arm 88, which transmits the stress to the bottom of resonator 90, are made from materials with the same coefficient of thermal expansion or one piece of material so that no thermal stress is imposed on resonator 90.

Figure 6:
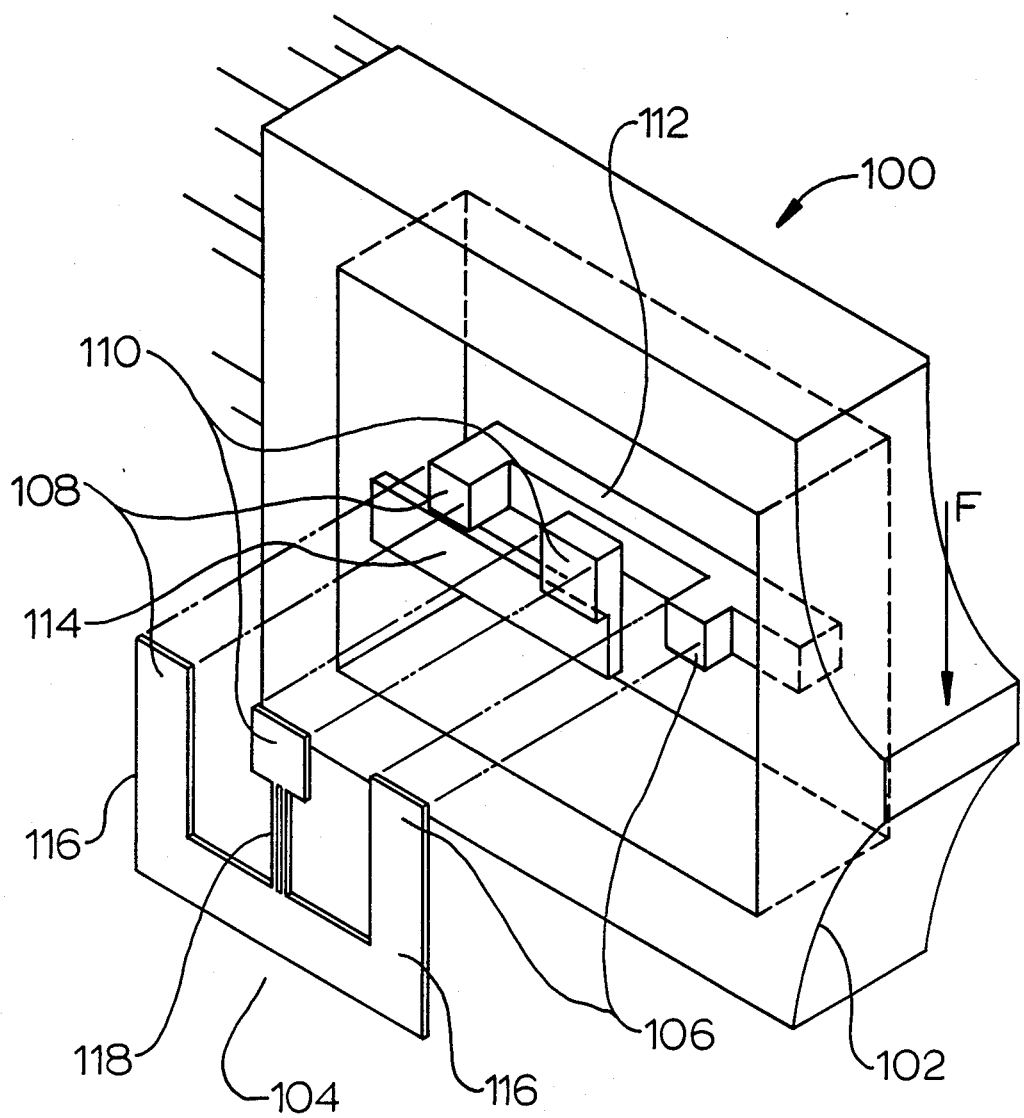
FIG. 6 is an isometric view of a monolithic, temperature-compensated, single-crystal shear stress load cell.

FIG. 6 is an exploded isometric view of a shear stress load cell 100 consisting of a cantilever beam 102 and monolithic, force-sensitive resonator structure 104, which is attached to the cantilever beam 102 at locations 106, 108, and 110. When load F is applied, cantilever beam 102 deflects, causing projection 112 to deflect downwardly with respect to projection 114. This places arm 116 of resonator structure 104 under compression and places resonator 118 under tension, causing an increase in output frequency. This increase in frequency of resonator 118 is a measure of applied load F. Since arms 116 are made of material with the same thermal expansion coefficient as resonator 118, no thermal stress is imposed on resonator 118. Thus, load cell 100 is sensitive to applied load but insensitive to temperature changes.

Figure 7:
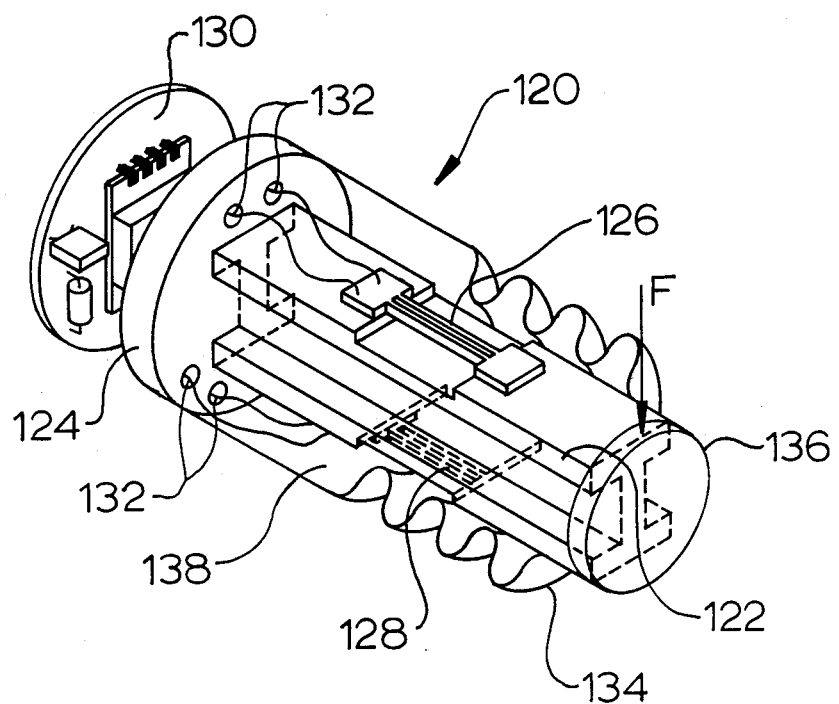
FIG. 7 is an isometric view of a dual-resonator bending stress load cell.

FIG. 7 is an isometric view of a dual-resonator bending stress load cell 120. A cantilever beam 122, which may be of "T" beam cross section for cross axis rigidity, is attached to or extends from base 124. Resonator force sensor 126 is an integral part of or attached to the top of cantilever beam 122. Resonator force sensor 128 is an integral part of or attached to the bottom of cantilever beam 122. The resonators 126, 128 are bonded to beam 122 only at spaced-apart mounting pads rather than along their full length, as with most stress gauges. Thus, they measure the net strain between mounting pads, allowing novel designs in which the resonators can span windows or gaps in the beam. Connections to respective conventional electronic oscillators 130, which maintain the vibrations of resonators 126, 128, are made through hermetic feed-throughs 132 in base 124. As is well known in the art, the signal generated by the oscillator 130 for each resonator 126, 128 will have a frequency equal to the resonant frequency of the respective resonator 126, 128. A bellows 134 is hermetically sealed and attached to the base 124 and end 136 of cantilever beam 122 such that resonators 126, 128 may operate in a vacuum or inert atmosphere 138. When a force F is applied to end 136 of cantilever beam 122, the moment causes beam 122 to bend about its neutral axis, thus placing resonator 126 in tension and resonator 128 in compression. Thus the frequency of resonator 126 increases while the frequency of resonator 128 decreases with applied load F.

Even though the frequencies of the outputs of resonator 126 or resonator 128 are indicative of the applied load F, it is best to measure the applied load F as a function of the difference between the resonant frequency of resonator 126 and the resonant frequency of resonator 128 because common mode environmental errors can be cancelled. Common mode errors result from changes in the resonant frequencies of the resonators 126, 128 which are substantially equal to each other. For example, when beam 122 expands responsive to increases in temperature, both resonators 126, 128 are tensioned by the same amount. The difference between the resonant frequencies of the resonators 126, 128 caused by this increase in temperature is thus substantially zero. For example, even though the coefficients of thermal expansion of the resonators 126, 128 and that of the cantilever beam 122 are chosen to be close to the same value, differential thermal expansion between the beam 122 and resonators 126, 128 stresses the resonators equally and with the same polarity. Thus, thermal errors cancel when the frequencies of the two resonators 126, 128 are subtracted. Similarly, pressure-induced effects are reduced because the end loading effects transmitted by bellows 134 cancel when the frequencies of resonators 126, 128 are subtracted from each other.

Figure 8:
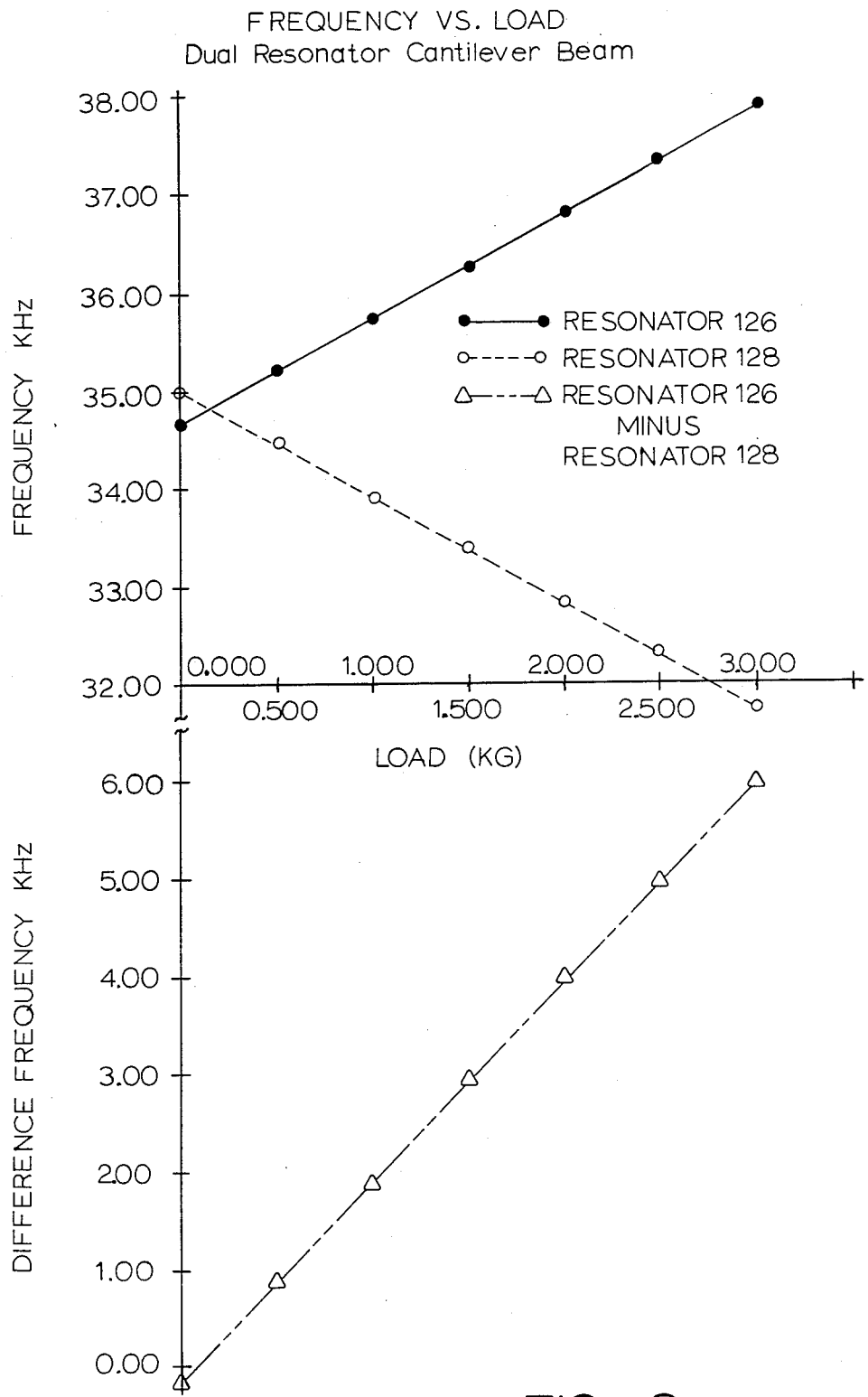
FIG. 8 is a graph of dual-resonator load cell individual frequencies and difference frequency versus load.

FIG. 8 is a graph of the resonant frequency versus applied load for a dual-resonator load cell such as illustrated in FIG. 7. Resonator 126 is placed in tension, with the applied load thus increasing its frequency of oscillation. Resonator 128 is simultaneously placed in compression, thus decreasing its resonant frequency. As shown on the graph, each resonator undergoes a fractional frequency change of about 10% for the full-scale applied load of 3 kilograms. Although the individual resonator frequency outputs are not linear with the applied load, the difference frequency is much more linear. Also, by subtracting the frequencies of resonator outputs, common mode errors, such as differential thermal expansion effects, are reduced.

As mentioned above and as shown in FIG. 7, the resonators 126, 128 are normally employed to measure forces since the resonant frequencies of the resonators 126, 128 are functions of the axial force applied thereto. However, in the inventive load cell, the resonators 126, 128 are used as strain sensors rather than stress or force sensors. In other words, the elongation or contraction of the resonators 126, 128 is determined by the elongation or contraction of the beam 122 to which they are attached rather than the forces applied to the resonators 126, 128. Instead, the forces affecting the resonant frequencies of the resonators 126, 128 are generated by the elastic properties of the resonators 126, 128 themselves. When the resonators 126, 128 contract or elongate, axial forces are generated in the resonators 126, 128 that are proportional to the product of the strains in the resonators 126, 128 and the modulus of elasticity of the material forming the resonators 126, 128.

Figure 9:
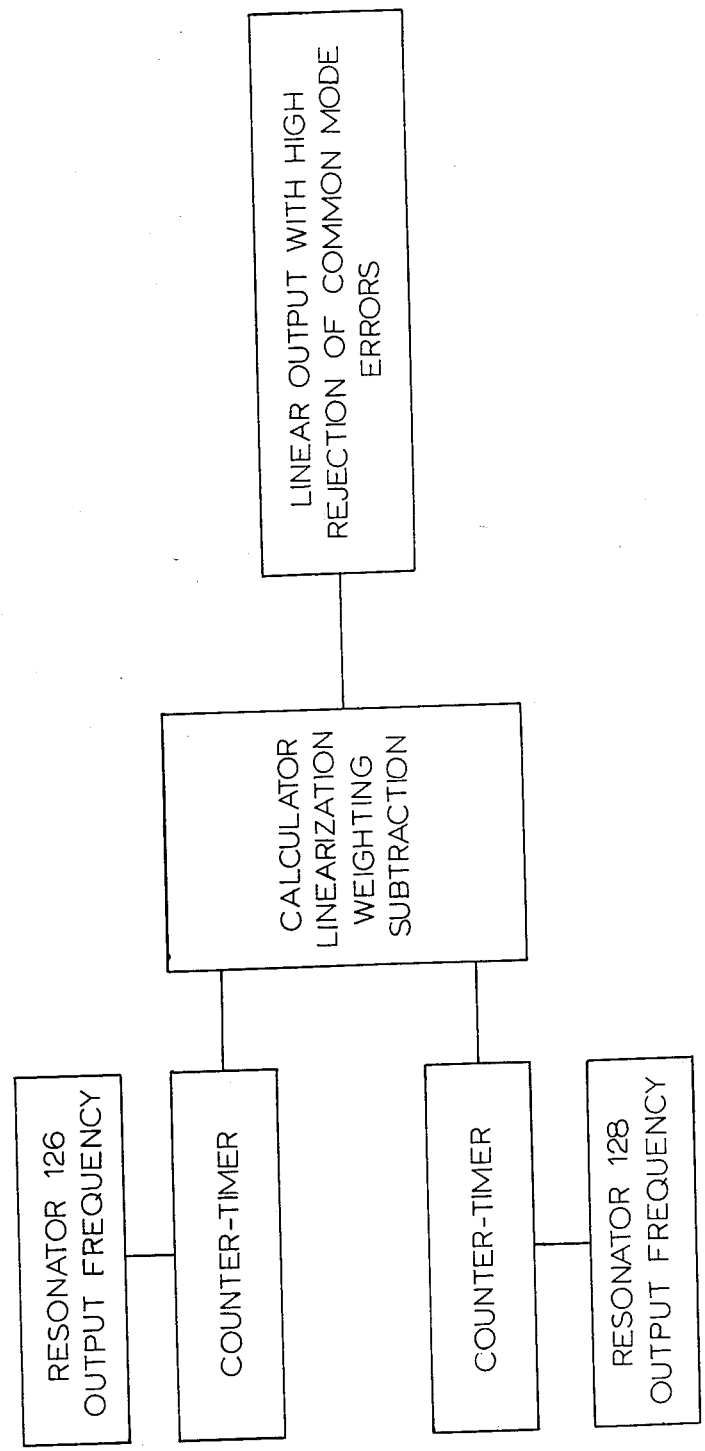
FIG. 9 is a block diagram of a dual-resonator signal processor.

FIG. 9 is a block diagram showing a method of processing the signal outputs. The frequency or period output of each resonator is measured using a conventional counter-timer. Signals indicative of the resonant frequency of each resonator are fed into a conventional computer, which performs three numerical tasks. First, the individual resonator outputs are linearized. Next, the outputs are "weighted" or scaled such that environmental errors due to common mode effects such as temperature are of equal magnitude for each resonator. The last step is to subtract the frequencies' processed output signals, resulting in a linear output with a high rejection of common mode errors. The weighting could be performed on the resonator frequency outputs to cancel common mode errors prior to linearization.

Figure 10:
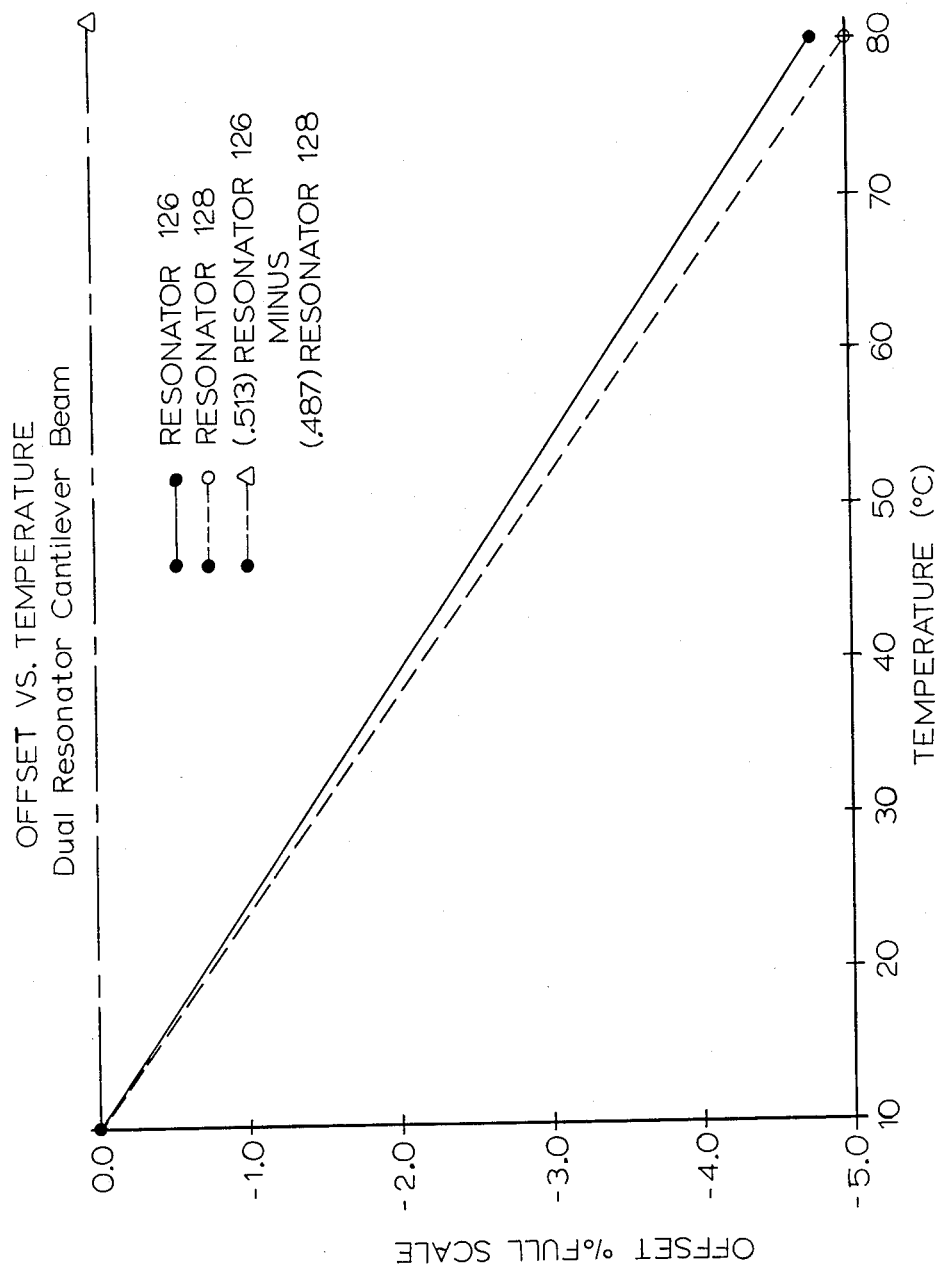
FIG. 10 is a graph of individual resonator temperature errors and common mode rejected temperature errors versus temperature for a dual-resonator load cell.

FIG. 10 is a graph showing how effective the common mode rejection technique is at reducing temperature errors in a dual-resonator load cell such as illustrated in FIG. 7. Even though the coefficients of thermal expansion of resonators 126, 128 and cantilever beam 122, shown in FIG. 7, were carefully matched, each resonator had an individual thermal sensitivity of approximately 0.7% full-scale per degree C. By subtracting the resonator outputs, the thermal errors were reduced to less than 0.002% per degree C. Almost perfect cancellation can be obtained by "weighting" or scaling the common mode errors to be identical prior to subtracting the processed resonator outputs. This weighting or scaling has the effect of making the slopes of the offset vs. temperature graphs illustrated in FIG. 10 equal to each other. For example, if the thermal sensitivity of resonator 126 equaled 0.0679%/degree C and that of resonator 128 equaled 0.0714%/degree C, then weighting the output of resonator 126 by multiplying its output by a factor of 0.513 and multiplying the output of resonator 128 by 0.487 would provide perfect cancellation of thermal errors instead of an error of 0.002%/degree C if the outputs were subtracted without weighting.

Figure 11:
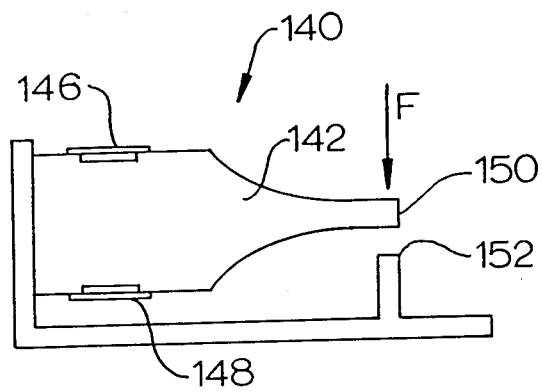
FIG. 11 is a plan view of a bending mode load cell with resonators mounted external to the beam.

FIG. 11 illustrates a bending mode load cell 140 consisting of a cantilever beam 142 to which force-sensitive resonators 146 and 148 are attached. When force F is applied to end 150 of beam 142, resonator 146 is tensioned and resonator 148 is compressed. Limit stop 152 protects the load cell from extreme deflection when overloaded.

Figure 12:
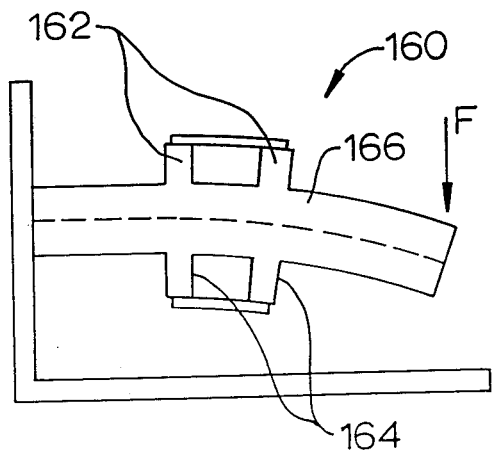
FIG. 12 is a plan view of a bending mode load cell with resonators mounted on projections from the beam.

FIG. 12 illustrates a bending mode load cell 160, similar to that shown in FIG. 11 except the resonators are mounted to projections 162 and 164, which extend from beam 166. The projections can amplify or reduce the strain imparted to the resonators resulting from a given deflection of beam 166. If the projections 162 and 164 are stiff compared to the resonators, the strain imparted to the resonators is amplified. If the projections are flexible compared to the resonators, the strain imparted to the resonators will be reduced. Flexibility can be achieved by reducing the cross section of the projections, by increasing the length of the projections, or by introducing flexures in the projections.

Figure 13:
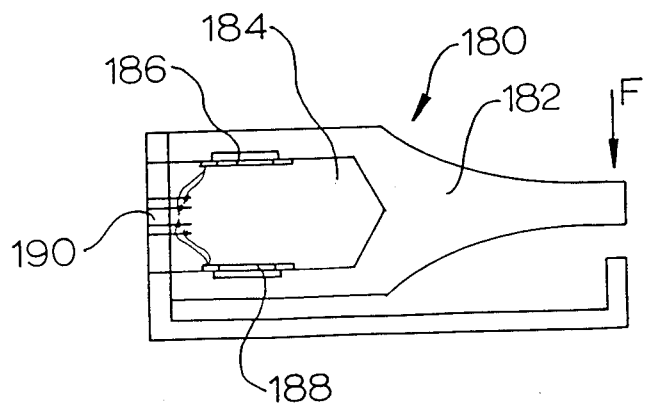
FIG. 13 is a plan view of a bending mode load cell with dual resonators mounted internal to the cell.

FIG. 13 illustrates a plan view of a bending mode load cell 180 consisting of a cantilever beam 182 with a hollow interior 184 to which force-sensitive resonators 186 and 188 are attached. Electrical connections from resonators 186 and 188 are made through hermetically sealed feedthroughs 190. Interior 144 may be evacuated so that resonator performance is enhanced by vacuum operation.

The load cells described in FIGS. 11, 12, and 13, are termed "bending mode" load cells since they measure the magnitude of the force-induced bending of the beam to which they are attached. In a bending mode load cell, the beam has a neutral bending plane that is perpendicular to the applied force and which undergoes neither compression nor tension. On one side of the neutral bending plane, the beam is tensioned. On the other side of the neutral bending plane, the beam is compressed. The resonators are normally positioned on the beam so that they are on opposite sides and equidistant from the neutral bending plane. As a result, the resonators are stressed equally but in opposite directions in response to non-isotropic strains resulting from forces imparted to the beam. However, the resonators are stressed equally and in the same direction in response to axial strains, such as those resulting from temperature variations in the beam and axial loading of the beam.

Load cells may also be produced that operate in a "shear mode." In shear mode load cells, the resonators are mounted on the sides of the beam, with their areas of attachment to the beam defining a parallelogram in which the areas of attachment for each resonator occupy opposite corners of the parallelogram. When the beam bends, it undergoes a shear strain that causes the angles at the corners of the parallelogram to vary, thus tensioning one resonator and compressing the other. For best results, the areas of attachment to the beam form a square when the beam is in its unstressed condition. By placing the center of the parallelogram on the neutral bending plane, the load cell becomes insensitive to bending moments. As a result, the load cell can be insensitive to variations in the location at which forces are applied to the beam or the angle at which such forces are applied.

Figure 14:
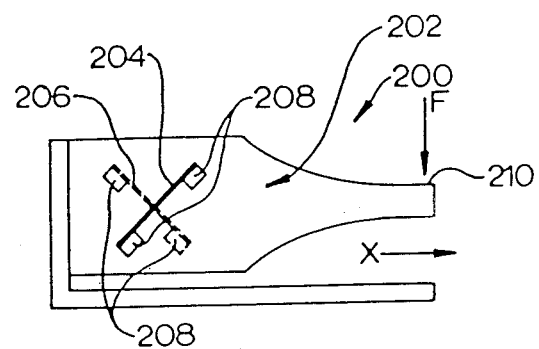
FIG. 14 is a plan view of a dual-resonator shear stress load cell with resonators mounted at an angle to the beam axis.

FIG. 14 illustrates a shear mode dual-resonator load cell 200 consisting of cantilever beam 202 and force-sensitive resonators 204 and 206 attached at mounting blocks 208 to beam 202, with their input force axes angles to the direction of the applied load F. Resonator 204 is placed in compression and resonator 206 is placed in tension due to the shear stress generated by load F. The difference between the frequency outputs of resonators 204 and 206 is a measure of the applied load F and provides common mode rejection of environmental effects. Common mode effects include, for example, stressing of the resonators 204, 206 from thermally induced expansions of the beam 202. Another common mode effect results from applying axial stresses (i.e., perpendicular to force F) to the beam 202, since such force loads both resonators 204, 206 equally. Compared to the bending mode load cell, this shear mode arrangement is less sensitive to changes in the X direction of point 210 at which the load F is applied.

Figure 15:
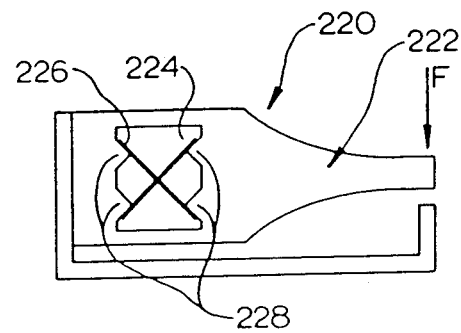
FIG. 15 is a plan view of a shear stress load cell with a pair of resonators mounted across a window in the beam.

FIG. 15 illustrates a shear mode dual-resonator load cell 220 consisting of cantilever beam 222 and force-sensitive resonators 224 and 226 attached at mounting points 228 to beam 222. Resonator 226 is placed in tension and resonator 224 is placed in compression due to the shear stress generated by load F. This configuration illustrates the principle of strain measured between respective spaced-apart points rather than continuously over the surface of the material of the beam. The absence of beam material in the rectangular area surrounding resonators 224 and 226 enhances the strain due to load F. The difference between the frequency outputs of resonators 224 and 226 is a measure of the applied load F and provides common mode rejection of environmental effects. The load cell 220 is substantially insensitive to variations in the location at which the force F is applied to the beam.

Figure 16:
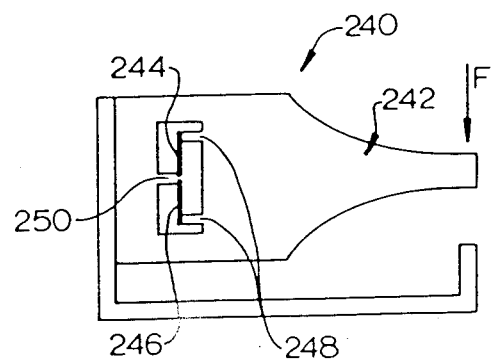
FIG. 16 is a plan view of a shear stress load cell with a pair of resonators at right angles to the beam axis.

FIG. 16 illustrates a shear mode dual-oscillator load cell 240 consisting of cantilever beam 242 and force-sensitive resonators 244 and 246 attached at mounting points 248 on the right and mounting point 250 on the left. Resonator 244 is placed in compression and resonator 246 is placed in tension due to the shear stress generated by load F on beam 242. The difference between the frequency outputs of resonators 244 and 246 is a measure of the applied load F. Mounting points 248 and 250 are stiff compared to resonators 244 and 246. Mounting points 248 deflect downwardly under applications of load F. This downward deflection is applied directly to resonators 244 and 246. The resonators are decoupled from beam bending moment stresses, which act orthogonally to the resonators. Common mode effects, such as thermally induced expansion of the beam 242 or stress induced by axially applied forces, are substantially cancelled when the difference between the resonant frequencies is determined. This configuration illustrates another example of measuring strain between spaced-apart mounting pads that cannot be accomplished by normal strain gauges.

Figure 17:
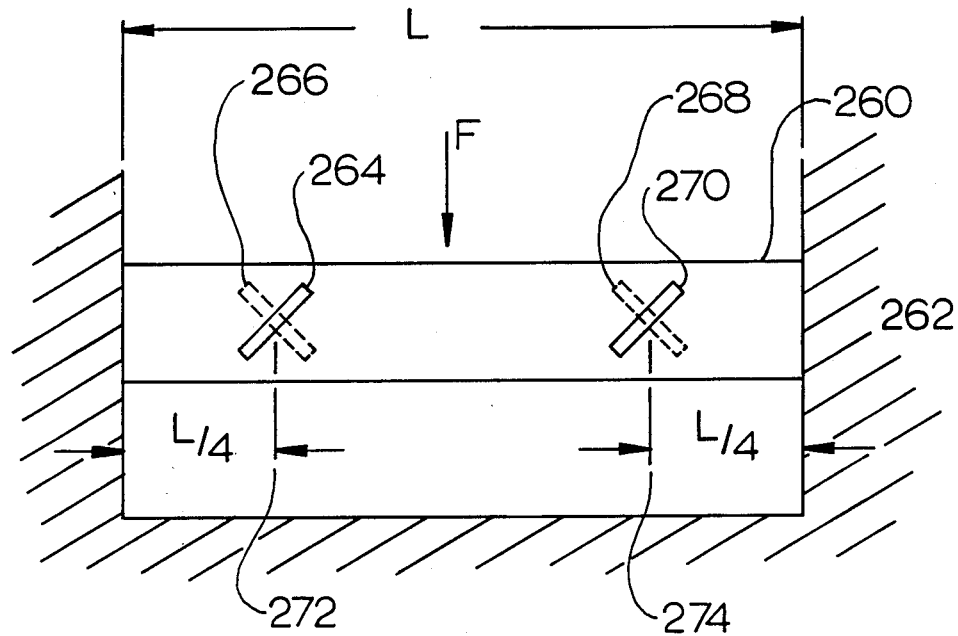
FIG. 17 is a plan view of a shear mode load cell using two pairs of resonators.

FIG. 17 illustrates a shear mode load cell consisting of a fixed-fixed beam 260 attached to a base structure 262. Force-sensitive resonators 264, 266 and resonators 268, 270 are attached to the sides of beam 260 at positions 272 and 274, respectively. The optimum location for each pair of resonators 264, 266 and 268, 270 is at the position where the bending moment is zero. For a constant section beam loaded at its center, these points are L/4 from each end of the beam. The output of each pair of force-sensitive resonators 264, 266 and 268, 270 can be processed, as described earlier, to yield a net output which cancels common mode errors such as thermal expansion or end loading.

Actually, a single pair of force-sensitive resonators at either location will give good performance. The second pair allows the combined output to be independent of small displacements in the load position.

The processed outputs of the two pairs can also be weighted and added to provide further rejection of load position sensitivity or to reject side load, which, in FIG. 17, would be perpendicular to the page. A third error that could be cancelled would be the moment from a load that is solidly attached to the beam. In some applications, it may be advantageous not to have a pivot at the load point.

FIGS. 18a, 18b, 18c, 18d and 18e illustrate other arrangements of load cells. In all cases, one or more pairs of force-sensitive resonators are used to measure stress in loaded beams. The resonator pairs or groups of pairs are positioned on the beams so as to provide rejection of unwanted common mode effects, such as might be introduced by thermal effects, orthogonal loads, or uncertainty in position of application of the load to be measured.

Figure 18A:
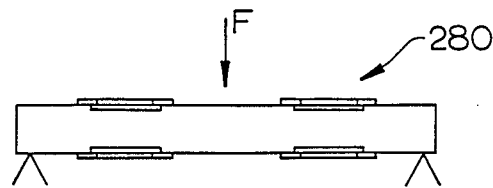
FIGS. 18a through 18e are plan views of load cells using other configurations of resonator pairs.

FIG. 18a illustrates a load cell 280 that provides compensation for uncertainty in position of load application and support.

Figure 18B:
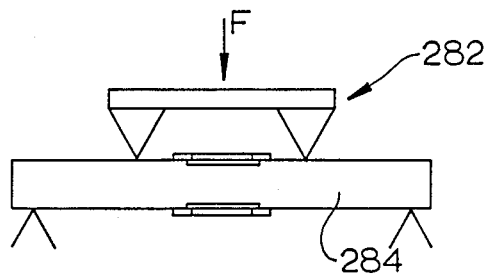

FIG. 18b illustrates a load cell 282 which allows measurement of the maximum bending stress in a beam 284, with compensation for uncertainty in position of load application.

Figure 18C:
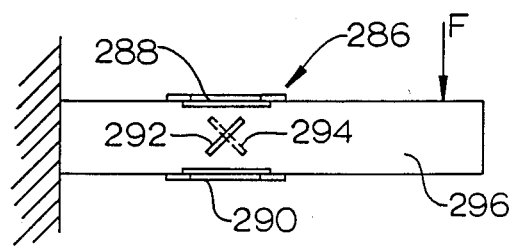

FIG. 18c illustrates a load cell 286 with a combination of load-sensitive resonators 288, 290, 292, 294 mounted on beam 286 that measure both bending stress and shear stress independently so that one output can be used to compensate for the other.

Figure 18D:
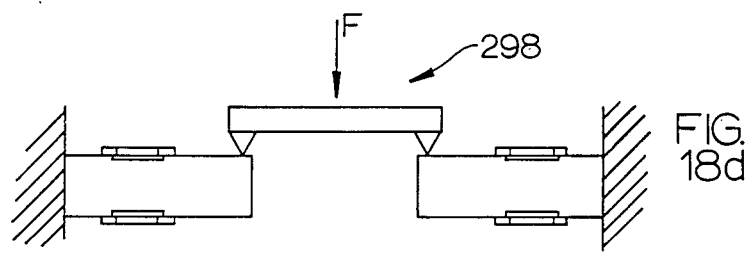

FIG. 18d illustrates a load cell 298 that compensates for uncertainty in the position of load application.

Figure 18E:
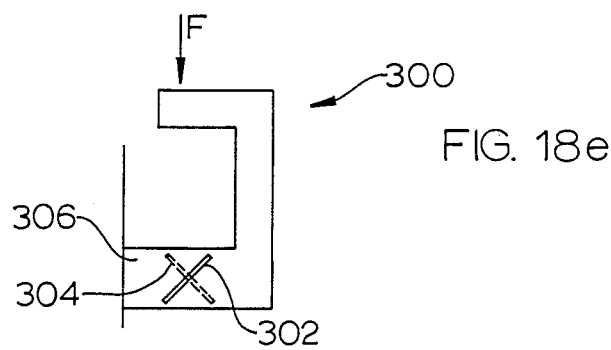

FIG. 18e illustrates a load cell 300 which places a pair of load-sensitive resonators 302, 304 at a position on a beam 306 where bending moment is zero.

Figure 19:
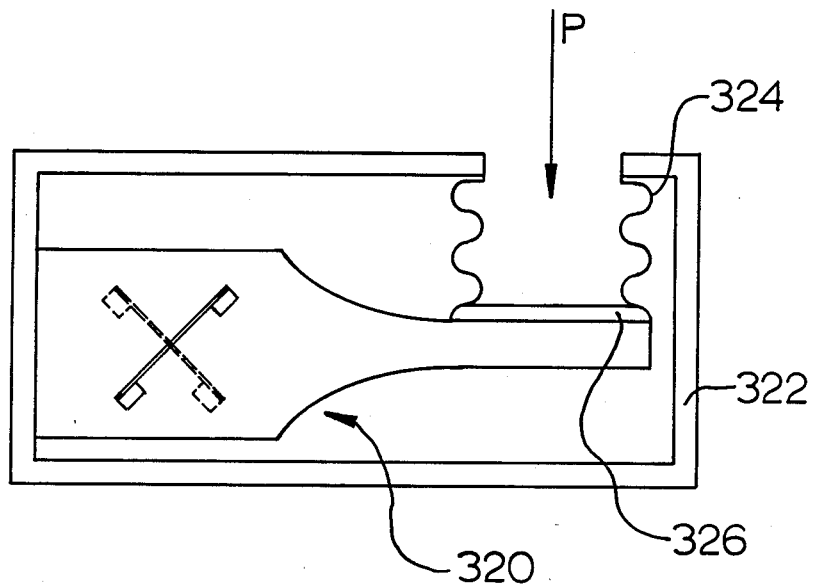
FIG. 19 is a plan view of an absolute pressure transducer employing a dual-resonator shear mode load cell.

FIG. 19 illustrates an absolute pressure transducer consisting of a shear mode dual-resonator load cell 320 mounted in an airtight evacuated housing 322. A bellows 324 with one closed end 326 is hermetically sealed to housing 322 and attached to load cell 320 such that pressure acts on the effective area of bellows 324 to apply force to the load cell 320. The output of load cell 320, consisting of the difference in the processed frequencies of the dual resonators, is an accurate measure of the applied absolute pressure P. Similar devices could be built with a different type of pressure-to-force conversion mechanism, such as a bourdon tube or diaphragm, in place of bellows 324.

Figure 20:
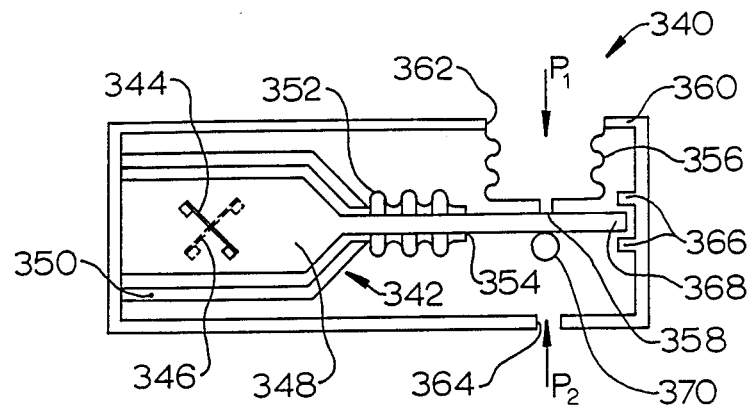
FIG. 20 is a plan view of a differential pressure transducer employing a dual-resonator shear mode load cell.

FIG. 20 illustrates a differential pressure transducer 340 employing a shear mode dual-resonator load cell 342 similar to the one shown in FIG. 14. Force-sensitive resonators 344, 346 are attached to cantilever beam 348, which is mounted in an airtight housing 350, which may be evacuated or filled with an inert gas. Flexible bellows 352 hermetically seals housing 350 and portion 354 of cantilever beam 348. A pressure-sensitive element, such as an airtight bellows 356, is attached to beam 348 at location 358 and sealed to housing 360 at pressure P1 inlet port 362. Housing 360 also contains a pressure port 364 through which pressure P2 is applied. Differential pressure (P1−P2) acting on the effective area of bellows 356 generates a force at location 358 which is accurately measured by dual-resonator load cell 342. Stops 366 act as over-pressure protection by restraining motion of cantilever beam 348 at end 368. As before, a different type of pressure-to-force converting mechanism can be used in place of bellows 356. Similarly, bellows 352 could be replaced with a thin-walled section of tubing.

A major consideration in the design of differential pressure transducers is to reduce the errors associated with common mode line pressure effects. In other words, it is desirable to have no change in output if line pressures P1 and P2 vary but differential pressure (P1−P2) is constant. Line pressure variations have no effect on bellows 356 since the line pressure is only acting simultaneously on the interior and exterior of bellows 356; however, line pressure variations do generate an error force through bellows 352, which isolates resonators 344, 346 and beam 348 from the pressure input P2. This line pressure error force is orthogonal to the sensing axis of load cell 342 and loads resonators 344, 346 equally and in the same direction. When the resonant frequencies of resonators 344, 346 are subtracted from each other, the common mode line pressure effects tend to be cancelled. Perfect cancellation can be obtained by weighting the relative sensitivities to line pressure of resonators 344, 346 prior to subtracting the frequencies of their outputs. Thus, common mode line pressure effects may be eliminated in the same fashion as was described earlier with common mode temperature effects. For applications where housing 360 is liquid filled, gravitational forces acting on cantilever beam 348 can be balanced by attaching a buoyant float 370 to the beam. Alternatively, the outer portion of cantilever beam 348 can be made hollow to provide the required buoyancy.

Figure 21:
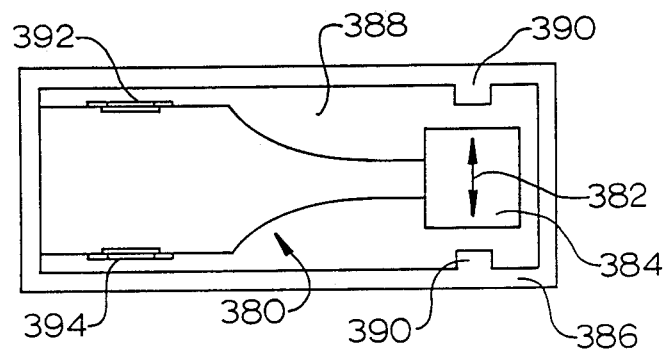
FIG. 21 is a plan view of a dual-resonator bending mode accelerometer.

FIG. 21 illustrates an accelerometer comprising dual-resonator load cell 380, which measures the forces generated by acceleration in direction 382 acting on inertial mass 384. Housing 386 may be hermetically sealed such that interior 388 may be evacuated or filled with an inert gas for optimum resonator performance. Stops 390 provide overload protection. Force-sensitive resonators 392, 394 typically have individual outputs which are non-linear with applied load. This non-linearity of a single resonator produces vibration rectification errors when the accelerometer is in a vibrational environment. As discussed earlier in terms of thermal errors and line pressure errors, these vibration rectification errors are another form of common mode problem which can be solved through the dual-resonator arrangement. Cancellation can be obtained by weighting the relative sensitivities to vibration rectification errors of resonators 392, 394 prior to subtracting their resonant frequencies. Other common mode errors which can be rejected in a similar fashion are accelerations along the other two orthogonal axes.

Figure 22:
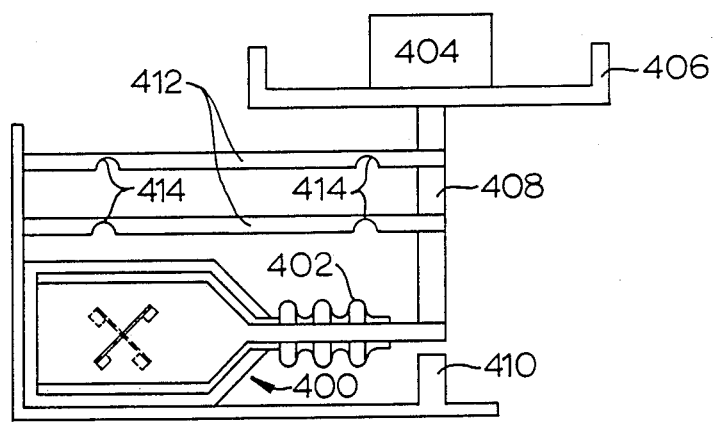
FIG. 22 is a plan view of a weighing scale employing a dual-resonator load cell.

FIG. 22 illustrates a weighing scale employing a dual-resonator load cell 400 of the type that is environmentally sealed through bellows 402. Weight 404 on pan 406 applies a load to cell 400 through transmitting structure 408. Stop 410 provides overload protection. Parallelogram suspension 412 with pivots 414 provides equal loading of cell 400 regardless of the off-center position of weight 404 in pan 406.

Figure 23:
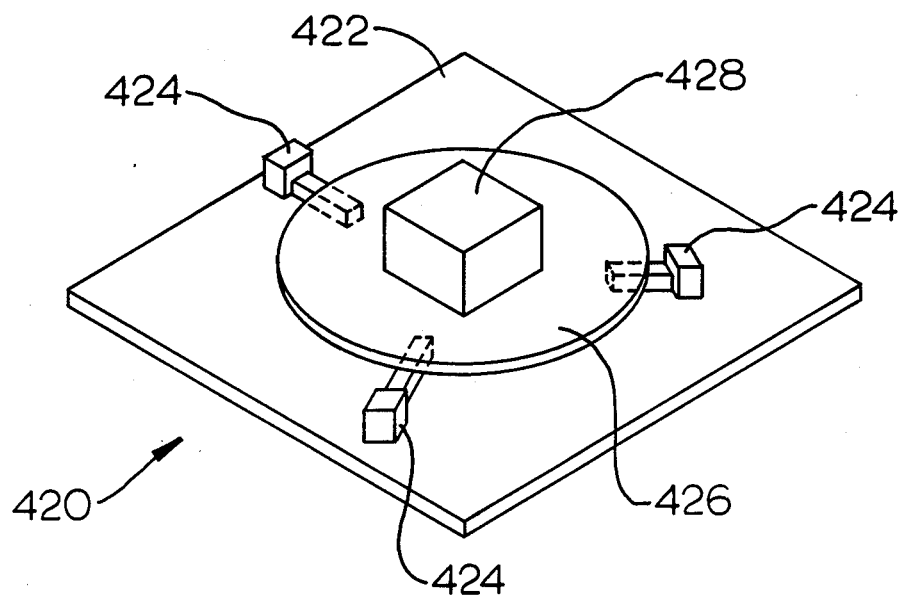
FIG. 23 is an isometric view of a weighing scale employing three load cells.

FIG. 23 illustrates a platform weighing scale 420 comprising a base 422 to which three dual-resonator load cells 424, such as illustrated in FIG. 7, are attached and with platform 426 applying loads to the cells 424 due to weight 428. A weighted sum of the outputs of the three cells 424 may be taken such that their combined output is an accurate measure of weight 428 regardless of the off-center position of weight 428 on platform 426.

Figure 24:
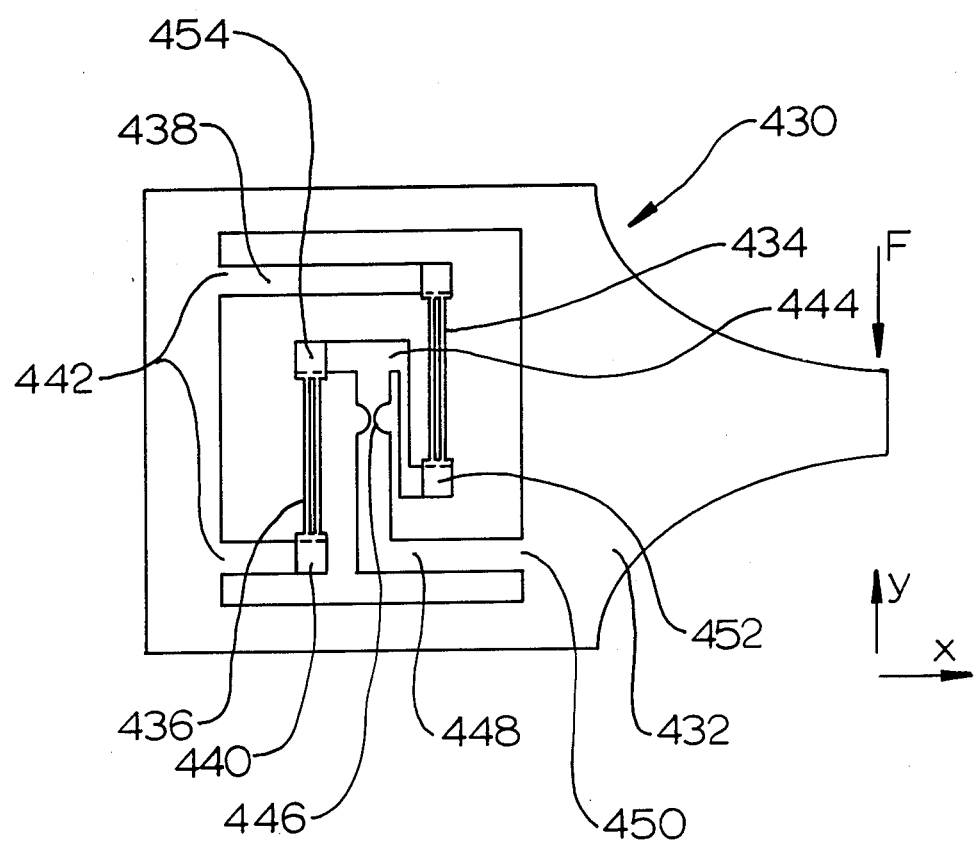
FIG. 24 is a plan view of a shear mode, dual-resonator load cell with an angularly compliant resonator mounting system which is insensitive to thermal expansion of the load cell.

FIG. 24 illustrates a shear mode load cell 430 consisting of a cantilever beam 432 to which force-sensitive resonators 434, 436 are attached. Resonators 434, 436 are attached at one end to projections 438 and 440, respectively, which extend from the left side of load cell 430 at locations 442. The other ends of resonators 434, 436 are attached to suspension arm 444 at locations 452 and 454. Suspension arm 444 is connected by means of flexure 446 to arm 448, which, in turn, is connected to the right side of load cell 430 at location 450. Flexure 446 is stiff in the "y" direction but has angular compliance about the axis perpendicular to the "x-y" plane. When load F is applied to the end of cantilever beam 432, arm 448 is deflect downwardly, placing resonator 436 in compression and resonator 434 in tension. The difference between the frequency outputs of resonators 434 and 436 is a measure of applied load F. Because flexure 446 is compliant about the axis perpendicular to the "x-y" plane but stiff along the "y" direction, forces due to deflection of cantilever beam 432 can be transmitted to resonators 434 and 436, while forces due to thermal expansion of resonators 434 and 436 relative to the cantilever beam 432 are relieved by rotation of suspension arm 444 about the axis defined by flexure 446. The optimum location for flexure 446 is to be centered between the ends 452 and 454 of resonators 434 and 436.

Figure 25:
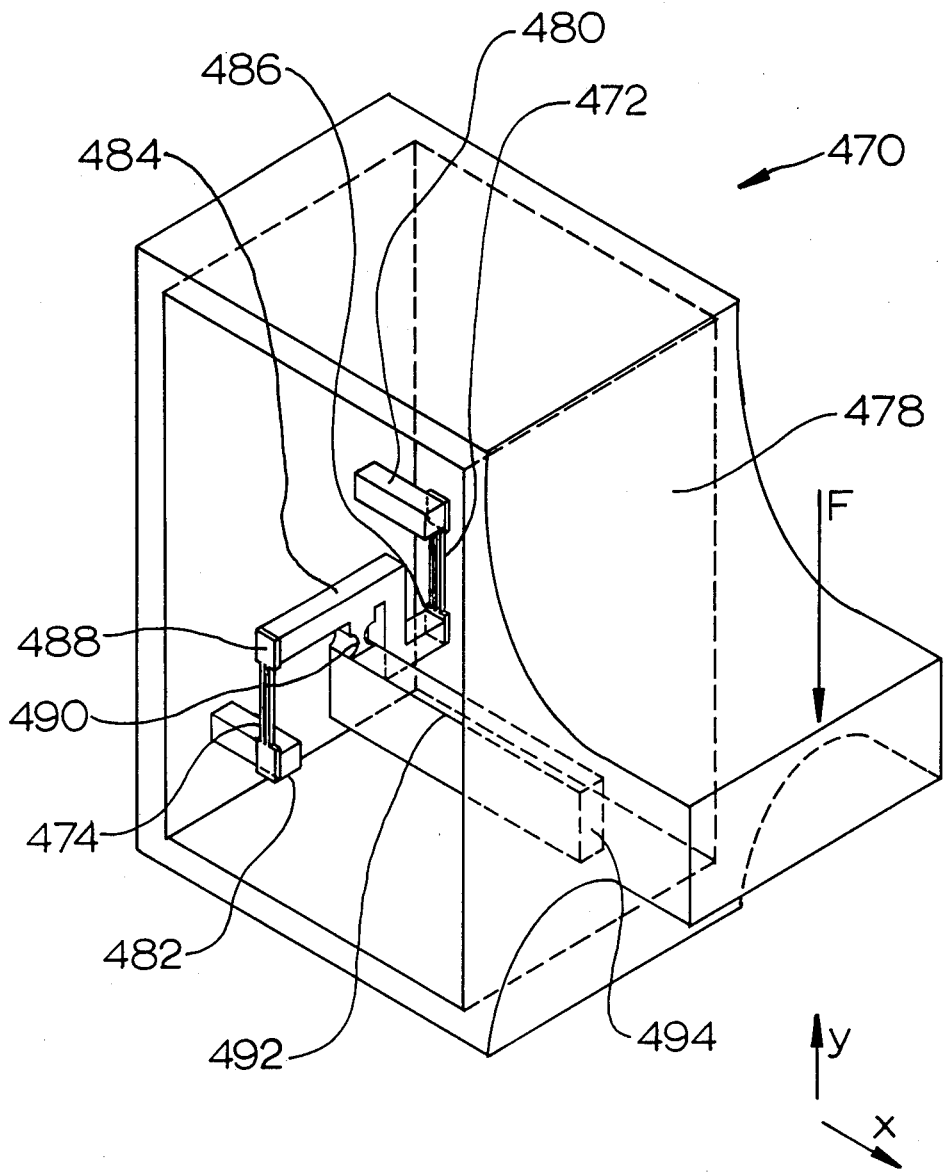
FIG. 25 is a plan view of another realization of a shear mode, dual-resonator load cell with an angularly compliant resonator mounting system.

FIG. 25 is an isometric view of a shear load cell 470 similar to FIG. 24 with angular compliant mounting of force-sensitive resonators 472 and 474 attached to cantilever beam 478. In this illustration, the axis of angular compliance of flexure 490 is about the "x" direction along the length of the beam. Force-sensitive resonators 472 and 474 are attached to the angularly compliant suspension arm 484 at locations 486 and 488.

Suspension arm 484 is connected by means of flexure 490 to arm 492, which, in turn, is connected to the right side of beam 478 at location 494. When load F is applied to the end of cantilever beam 478, resonator 474 is placed in compression and resonator 472 is placed in tension. The difference between the frequency outputs of resonators 472 and 474 is a measure of applied load F. Flexure 490 provides angular compliance of suspension arm 484 to relieve thermal stress induced by the difference in thermal expansion coefficients of resonators 472 and 474 relative to cantilever beam 478.

Figure 26:
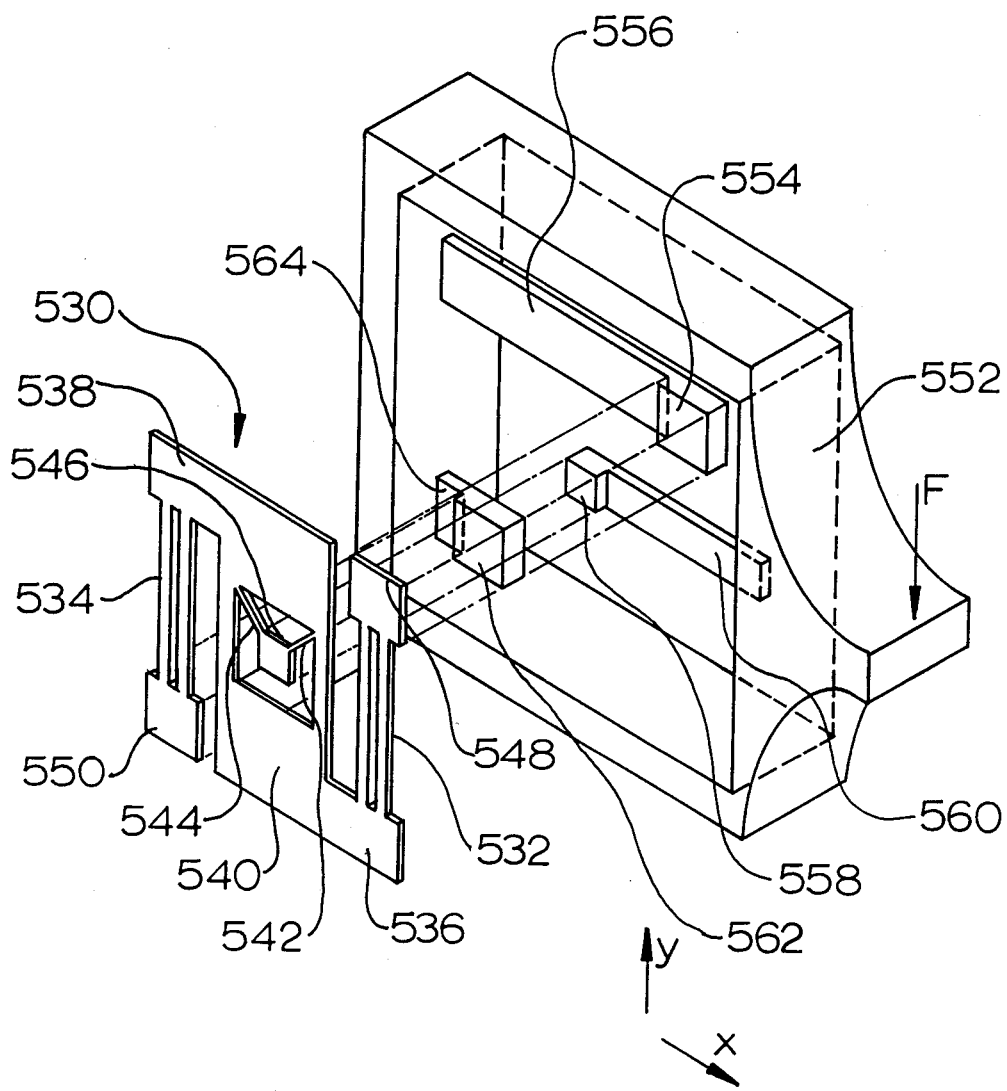
FIG. 26 is an isometric view of a shear mode load cell with a monolithic, angularly compliant, dual-resonator arrangement.

FIG. 26 is an isometric view of a monolithic, angularly compliant, dual-resonator load cell 530 which can be fabricated from one piece of material, such as piezoelectric quartz, by means such as photolithographic processing. The dual-resonator assembly consists of resonators 532 and 534 that are respectively connected at end 536 and 538 to central plate 540. Two flexible arms 542 and 544 project from plate 540 to connect with mounting pad 546. The flexible arms 542 and 544 provide linear stiffness of mounting pad 546 relative to plate 540 in the "x" and "y" directions but allow angular compliance of mounting pad 546 about the axis perpendicular to the "x-y" plane relative to plate 540.

The dual-resonator unit can be attached to a cantilever arm 552 by attaching mounting pad 548 to end 554 of arm 556, attaching pad 546 to end 558 of arm 560, and attaching pad 550 to end 562 of arm 564. When load F is applied to cantilever beam 552, resonator 532 is placed in tension and resonator 534 is placed in compression. The difference in output frequencies of resonators 532 and 534 is a measure of applied load F. The angular compliance of dual-resonator unit 530 relieves thermal stress in resonators 532 and 534.

We claim:

1. A resonator load cell comprising:
    a beam supported at one or more locations, said beam being adapted to receive a force at a location spaced from the location(s) where the beam is supported, thereby causing said beam to bend in proportion to the magnitude of said force; and
    a force-sensitive resonator mounted on said beam, one end of said resonator being mounted to said beam at a first point of attachment thereto and the other end of said resonator being mounted on a relatively rigid coupling member extending in parallel with the axis of sensitivity of said resonator to a second point of attachment to said beam, said first and second points of attachment to said beam being spaced apart along the longitudinal axis of said beam, said coupling member having a coefficient of thermal expansion that is matched to the coefficient of thermal expansion of said resonator so that the thermally induced strain of said resonator is matched by the thermally induced strain of said coupling member, whereby said coupling member transmits the strain of said beam to said resonator while making said load cell relatively insensitive to temperature variations.

2. The resonator load cell of claim 1 wherein said resonator and said coupling member extend in equal distances along the axis of sensitivity of said resonator and have substantially identical coefficients of thermal expansion.

3. A resonator load cell, comprising:
    a resilient beam adapted to receive a force applied between two spaced-apart locations, thereby causing said beam to bend in proportion to the magnitude of said force;
    a force-sensitive resonator having an axis of sensitivity extending between first and second mounting pads, said first mounting pad being secured to said beam at a first location; and
    a compensating leg having a first end secured to the second mounting pad of said resonator and a second end coupled to said beam at a second location spaced apart from said first location, said compensating leg having a coefficient of thermal expansion that is matched to the coefficient of thermal expansion of said resonator, so that the thermally induced strain of said resonator is compensated for by the thermally induced strain of said compensating leg.

4. The resonator load cell of claim 3, further including a relatively rigid actuating member extending between the second end of said compensating leg and said beam at said second location, thereby coupling the second end of said compensating leg to said beam.

5. The resonator load cell of claim 4, wherein said actuating member extends in parallel with said resonator and said compensating leg.

6. The resonator load cell of claim 3, wherein said resonator and compensating leg extend in equal distances along the axis of sensitivity of said resonator and have substantially identical coefficients of thermal expansion.

* * * * *